(12) United States Patent
Meyerhoff et al.

(10) Patent No.: US 12,478,767 B2
(45) Date of Patent: Nov. 25, 2025

(54) URINARY CATHETER TREATMENT

(71) Applicant: THE REGENTS OF THE UNIVERSITY OF MICHIGAN, Ann Arbor, MI (US)

(72) Inventors: Mark E. Meyerhoff, Ann Arbor, MI (US); Orsolya I. Lautner-Csorba, Ann Arbor, MI (US); Griffin Murray, Grosse Pointe Farms, MI (US); Gergely Lautner, Ann Arbor, MI (US); Alexander S. Yevzlin, Black Earth, WI (US); Karthik Ramani, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 663 days.

(21) Appl. No.: 17/916,491

(22) PCT Filed: Mar. 31, 2021

(86) PCT No.: PCT/US2021/025147
§ 371 (c)(1),
(2) Date: Sep. 30, 2022

(87) PCT Pub. No.: WO2021/202709
PCT Pub. Date: Oct. 7, 2021

(65) Prior Publication Data
US 2023/0084608 A1    Mar. 16, 2023

Related U.S. Application Data

(60) Provisional application No. 63/004,259, filed on Apr. 2, 2020.

(51) Int. Cl.
*A61M 25/10* (2013.01)
*A61M 25/00* (2006.01)

(52) U.S. Cl.
CPC ........ *A61M 25/10* (2013.01); *A61M 25/0017* (2013.01); *A61M 2025/105* (2013.01); *A61M 2202/0275* (2013.01)

(58) Field of Classification Search
CPC .............. A61M 25/10; A61M 25/0017; A61M 2025/105
See application file for complete search history.

(56) References Cited

U.S. PATENT DOCUMENTS 8,740,843 B2    6/2014  Eaton et al.
2009/0098187 A1*    4/2009  Peters ................ A61P 35/00
                                                           524/429

(Continued)

FOREIGN PATENT DOCUMENTS

WO    2005056102 A1    6/2005
WO    2008153762 A3    7/2009

(Continued)

OTHER PUBLICATIONS

Stamm, "Catheter-Associated Urinary Tract Infections: Epidemiology, Pathogenesis, and Prevention", Am J Med. Sep. 16, 1991; 91(3B):65S-71S. doi: 10.1016/0002-9343(91)90345-x., Sep. 16, 1991.

(Continued)

*Primary Examiner* — Dung T Ulsh
(74) *Attorney, Agent, or Firm* — Dierker & Kavanaugh, P.C.

(57) ABSTRACT

A method includes mixing a liquid carrier and a powder formulation including an S-nitrosothiol (RSNO) powder to form a nitric oxide generating solution; and within a predetermined time of mixing, introducing the nitric oxide generating solution into an inflatable and nitric oxide permeable balloon of a urinary catheter that is inserted in a patient.

9 Claims, 4 Drawing Sheets

(56) References Cited

U.S. PATENT DOCUMENTS

| | | |
|---|---|---|
| 2011/0151000 A1 | 6/2011 | Schultz et al. |
| 2018/0207323 A1 | 7/2018 | Chen et al. |
| 2019/0054038 A1* | 2/2019 | Meyerhoff ............ A61K 9/0043 |
| 2019/0091442 A1 | 3/2019 | Erbey, II et al. |
| 2019/0231936 A1 | 8/2019 | Chen |

FOREIGN PATENT DOCUMENTS

| | | |
|---|---|---|
| WO | 2009124379 A1 | 10/2009 |
| WO | 2020251947 A1 | 12/2020 |

OTHER PUBLICATIONS

Vaughn et al., "Estimation of nitric oxide production and reaction rates in tissue by use of a mathematical model", Am J Physiol. Jun. 1998;274(6):H2163-76. doi: 10.1152/ajpheart.1998.274.6.H2163., Jun. 1998.

Carlsson et al., "Intravesical Nitric Oxide Delivery for Prevention of Catheter-Associated Urinary Tract Infections", Antimicrobial Agents and Chemotherapy, 49(6), p. 2352-2355 doi: 10.1128/AAC.49.6.2352-2355.2005, Jun. 2005.

Lawrence et al., "Materials for urinary catheters: a review of their history and development in the UK", Medical Engineering & Physics 27 (2005) 443-453, Jul. 2005.

Wagenlehner et al., "Current challenges in the treatment of complicated urinary tract infections and prostatitis", Clin Microbiol Infect. May 2006; 12 Suppl 3:67-80. doi: 10.1111/j.1469-0691.2006.01398.x, May 2006.

Regev-Shoshani et al., "Slow Release of Nitric Oxide from Charged Catheters and Its Effect on Biofilm Formation by *Escherichia coli*", Antimicrobial Agents and Chemotherapy, 54(1), p. 273-279 doi: 10.1128/AAC.00511-09, Nov. 2, 2009.

Colletta et al., "S-Nitroso-N-acetylpenicillamine (SNAP) Impregnated Silicone Foley Catheters: A Potential Biomaterial/Device To Prevent Catheter-Associated Urinary Tract Infections", ACS Biomater. Sci. Eng. 2015, 1, 416-424 DOI: 10.1021/acsbiomaterials.5b00032, Apr. 27, 2015.

Singha et al., "A review of the recent advances in antimicrobial coatings for urinary catheters", Acta Biomater. Mar. 1, 2017; 50: 20-40. doi: 10.1016/j.actbio.2016.11.070. Epub, Dec. 1, 2016.

Margel et al., "Nitric oxide charged catheters as a potential strategy for prevention of hospital acquired infections", Plos One 12(4): e0174443. https://doi.org/10.1371/journal.pone.0174443, Apr. 14, 2017.

Wo et al., "Reduction of Thrombosis and Bacterial Infection via Controlled Nitric Oxide (NO) Release from S-Nitroso-N-acetylpenicillamine (SNAP) Impregnated CarboSil Intravascular Catheters", ACS Biomater. Sci. Eng. 2017, 3, 349-359 DOI: 10.1021/acsbiomaterials.6b00622, Jan. 22, 2017.

Homeyer et al., "Liquid-Infused Nitric-Oxide-Releasing Silicone Foley Urinary Catheters for Prevention of Catheter-Associated Urinary Tract Infections", ACS Biomater. Sci. Eng. 2019, 5, 2021-2029 DOI: 10.1021/acsbiomaterials.8b01320, Feb. 26, 2019.

\* cited by examiner

URINARY CATHETER TREATMENT

CROSS-REFERENCE TO RELATED APPLICATION

This application claims the benefit of U.S. Provisional Application Ser. No. 63/004,259, filed Apr. 2, 2020, the contents of which is incorporated by reference herein in its entirety.

BACKGROUND

Urinary catheters may be used for draining urine after surgeries and for urinary incontinence. Nosocomial urinary tract infections are often attributed to the urinary catheter, in part because the catheter materials allow for the colonization of microorganisms. Microorganism colonization can lead to bacteriuria and infection, which can lead to other complications, such as cystitis, pyelonephritis, gram-negative bacteremia, prostatitis, epididymitis, urosepsis, septicemia, etc.

SUMMARY

An example method, comprises mixing a liquid carrier and a powder formulation including an S-nitrosothiol (RSNO) powder to form a nitric oxide generating solution; and within a predetermined time of mixing, introducing the nitric oxide generating solution into an inflatable and nitric oxide permeable balloon of a urinary catheter that is inserted in a patient.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Multiple techniques have been explored to prolong the useful lifespan of urinary catheters without increasing the risk of infection in patients. Such techniques range from irrigating the bladder with antimicrobials, to developing antimicrobial materials for urinary catheters, to developing antimicrobial coatings for urinary catheters, to incorporating bioactive components into urinary catheters, where release of the bioactive component is initiated in vivo through the introduction of a trigger. These techniques involve additional equipment and/or the significant alterations to commercially available urinary catheters. Moreover, several of these techniques have been found to have no significant effect on preventing urinary tract infections.

The method disclosed herein utilizes a nitric oxide generating solution that is formulated just before introduction into the urinary catheter balloon. The nitric oxide generating solution is a self-contained nitric oxide generator. The solution is considered to be "self-contained" because it does not react, or otherwise interact, with any component incorporated into or onto the urinary catheter balloon in order to effectively generate and release nitric oxide. As such, no additional bioactive agents (e.g., NO donor compounds, NO generating accelerants, etc.) are incorporated into or onto the urinary catheter balloon that is used in the examples disclosed herein. As such, the nitric oxide generating solution can be used with any commercially available urinary catheter that includes a nitric oxide permeable balloon.

The method disclosed herein can increase the useful life of a short-term urinary catheter. Some short-term catheters have to be replaced every three days, or sooner. Using the method disclosed herein, efficient levels of NO can be released for up to seven days, and thus bacteria adhesion and biofilm formation on the urinary catheter can be prevented for up to seven days. This doubles the useful lifespan of the short-term urinary catheter with a three day lifespan. Moreover, the nitric oxide generating solution can be drained from the urinary catheter balloon and a freshly prepared nitric oxide generating solution can be introduced to fully re-inflate the urinary catheter balloon. Refreshing the solution can even further expand the useful lifespan of the short-term urinary catheter.

Still further, the method disclosed herein can help prevent urinary tract infections. With the method disclosed herein, the levels of nitric oxide generated in the catheter balloon and released in vivo through the catheter balloon walls are higher than the normal physiological levels that come from endothelial cells that line the inner walls of blood vessels. The released NO helps to kill bacteria and viruses, disrupt bacterial biofilm formation, and disperse or prevent microbial biofilm formation.

The prolonged NO release and the enhanced NO levels observed with the method disclosed herein were surprising and unexpected given the typical instability of S-nitrosothiol nitric oxide donors.

The method disclosed herein involves mixing a liquid carrier and a powder formulation including an S-nitrosothiol (RSNO) powder to form a nitric oxide generating solution; and within a predetermined time of mixing, introducing the nitric oxide generating solution into an inflatable and nitric oxide permeable balloon of a urinary catheter that is inserted in a patient.

The powder formulation includes the S-nitrosothiol (RSNO) powder.

S-nitrosoglutathione (GSNO) is one example of an NO releasing S-nitrosothiol (RSNO) molecule. GSNO exists in the human body as a result of NO (generated by endothelial cells, macrophages, sinus epithelial cells, etc.) reacting with oxygen to form $N_2O_3$, which can provide a nitrosonium ion ($NO^+$) to react with the thiol group of glutathione to form GSNO. As such, the use of GSNO in the powder formulation and the nitric oxide generating solution does not introduce any foreign or toxic agents into the bladder in the unlikely event of a balloon rupture or leakage.

GSNO may be prepared from glutathione (GSH) by acidifying a mixture of sodium nitrite/GSH with hydrochloric acid and then isolating the GSNO species (as solid crystals). Alternatively, the GSNO may be a commercially available chemical obtained from a number of vendors.

In some examples, S-nitrosothiol (RSNO) molecules other than GSNO may be used in the powder formulation. Examples of these other S-nitrosothiols include S-nitrosocysteine (CYSNO, naturally occurring in the human body), S-nitroso-N-acetyl-penicillamine (SNAP, decomposes to the drug, penicillamine, which is used to treat heavy metal ion poisoning), S-nitroso-penicillamine, and S-nitroso-human serum albumin (naturally occurring in the human body). Any of these RSNO molecules will not introduce any foreign or toxic agents into the bladder in the unlikely event of a balloon rupture or leakage.

In some examples, the powder formulation consists of the RSNO powder (e.g., without any other solids). In these examples, the RSNO powder makes up 100 percent of the solids in the powder formulation.

In other examples, the powder formulation includes the RSNO powder and an additive to control or accelerate a rate of release of NO from the RSNO powder after the powder formulation is dissolved in the liquid carrier. In some examples, the powder formulation consists of the RSNO powder and the additive (e.g., without any other solids). In an example, the additive is selected from the group consisting of reduced glutathione, cysteine, ascorbic acid or ascorbate, copper ions, zinc ions, zinc-oxide particles, an organoselenium species, and combinations thereof. Examples of the organoselenium species are selected from the group consisting of selenocysteine and ebeselen. An example of a combination of additives is reduced glutathione and ascorbate.

The following are some examples of how the additive can control or accelerate the rate of release of nitric oxide from RSNO, and in particular, from GSNO. Glutathione can increase the NO release rate from GSNO via the formation of an initial N-hydroxysulfenamide species (e.g., GS—N(OH)—SG), which then converts to a radical GS⁻ that can react with another GSNO molecule to liberate NO and form the GSSG disulfide species. Cysteine is able to transnitrosate with GSNO to form CysNO, which releases NO much faster than GSNO. Ascorbic acid or ascorbate can readily oxidize to form smaller threose structures (3 carbon sugars). The spontaneous oxidation of ascorbate can be coupled with reduction of GSNO to liberate NO plus GSH. Further, the oxidation products of ascorbate, i.e., the smaller threose structures, are also reducing agents that can provide electron(s) to GSNO, and thus may also contribute to the direct reduction of the GSNO to NO. In an example, the ascorbic acid or ascorbate may be allowed to oxidize in a solution for up to 5 days, dried, and then incorporated into the nitric oxide generating formulation. An organoselenium species can catalyze NO generation from GSNO. Copper or zinc ions may be reduced to their +1 oxidation state by any trace free thiols that exist in the GSNO formulation, and the Cu(I) or Zn(I) ions can then reduce the GSNO to NO and GSH.

Within the powder formulation, the molar ratio of the RSNO powder to the additive ranges from 1:10 (0.1) to 10:1 (10). In an example, the molar ratio of the RSNO powder to the additive is about 1:1.

In still other examples, the powder formulation includes the RSNO powder, the additive to control or accelerate the rate of release of NO from the RSNO powder after the powder formulation is dissolved in the liquid carrier, and a buffer salt. The buffer salt is present in a relatively low amount. Low amounts are desirable in order to avoid salt precipitation, and thus potential blockage, on the interior walls of the balloon inflation lumen of the catheter tubing (e.g., one lumen of dual lumen 12 in FIG. 1A), if, for example, some of the solution were to dry within this lumen. In an example, the buffer salt is present in an amount ranging from about 0.1 wt % to about 1 wt % of the dry powder formulation. Any suitable salt buffer may be included, such as, sodium chloride, sodium bicarbonate, a sodium phosphate buffer, a potassium phosphate buffer, and combinations thereof.

The powder formulation is dried so that the moisture (water) content is 5 wt % or less. In some instances, the moisture (water) content ranges from 0 to 1 wt %. Drying may be accomplished using lyophilization (freeze-drying) because some of the RSNO powders are air, light, and/or heat sensitive. Drying helps to stabilize the powder formulation.

The powder formulation may be stored. As such, the method may also involve storing the powder formulation in conditions that shield the powder formulation from light and moisture. Light and/or moisture can prematurely initiate release of nitric oxide from the RSNO powder, and thus it is desirable to shield the powder formulation from light and moisture during storage. Containers that are impermeable to oxygen and light are suitable for storing the powder formulation. Examples include a pouch (e.g., an aluminum pouch), an ampule, or other suitable sealable containers. Desiccants and/or oxygen scavengers may also be used.

As mentioned, the method disclosed herein involves mixing a liquid carrier and the powder formulation to form the nitric oxide generating solution. The liquid carrier may be selected from the group consisting of pure water, a saline solution, a saline solution with sodium bicarbonate ($NaHCO_3$), and a phosphate buffered saline solution (PBS). The water may be deionized water and/or purified water. In one example, the liquid carrier is deionized water.

The mixing involves adding the liquid carrier to the powder formulation to form the solution having a molar concentration of the dissolved RSNO ranging from about 500 µM to about 50 mM. By "adding the liquid carrier to the powder formulation" it is meant that the components are mixed together, and can be added in any order. For example, the powder formulation may be poured into a container including the liquid carrier, and then the components may be mixed. For another example, the liquid carrier may be poured into a container including the powder formulation, and then the components may be mixed. Mixing involves stirring or otherwise mixing to dissolve the powder formulation into the liquid carrier.

The pH of the nitric oxide generating solution may range from 5 to 8, especially if the buffer salt is present in the powder formulation.

If the pH of the solution is not within the desirable range after constitution, the method may also include adjusting a pH of the nitric oxide generating solution to a value ranging from 5 to 8 before introducing the nitric oxide generating solution into the inflatable and nitric oxide permeable balloon. These pH values are within the normal range of human urine. As such, if the nitric oxide generating solution was leaked into the patient (and mixed with urine), the nitric oxide generating solution would not have an incompatible pH that could potentially harm surrounding cells in the bladder or the urinary tract.

The pH of the nitric oxide generating solution may be adjusted by adding a buffer. Examples of suitable buffers include a sodium phosphate buffer or a potassium phosphate buffer. The concentration of the buffer may range from about 0.005 M to about 0.2 M, from about 0.05 M to about 0.2 M, from about 0.01 M to about 0.15 M, from about 0.1 M to about 0.15 M, or from about 0.5 M to about 0.1 M. The buffer does not deleteriously affect the ability of the RSNO in the solution to release nitric oxide.

Once the nitric oxide generating solution is prepared, and if necessary, adjusted to the desired pH, the method involves introducing the nitric oxide generating solution into an inflatable and nitric oxide permeable balloon of a urinary catheter that is inserted in a patient.

Figure 1A:
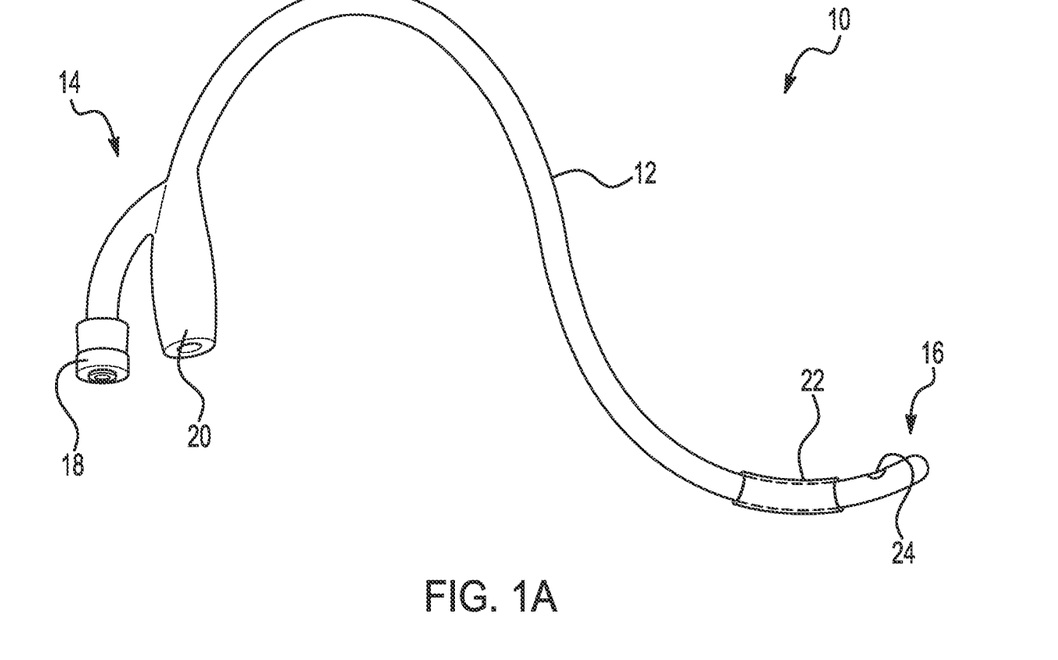
FIG. 1A is a schematic illustration of an example urinary catheter that can be used in an example of the method disclosed herein.
Figure 1B:
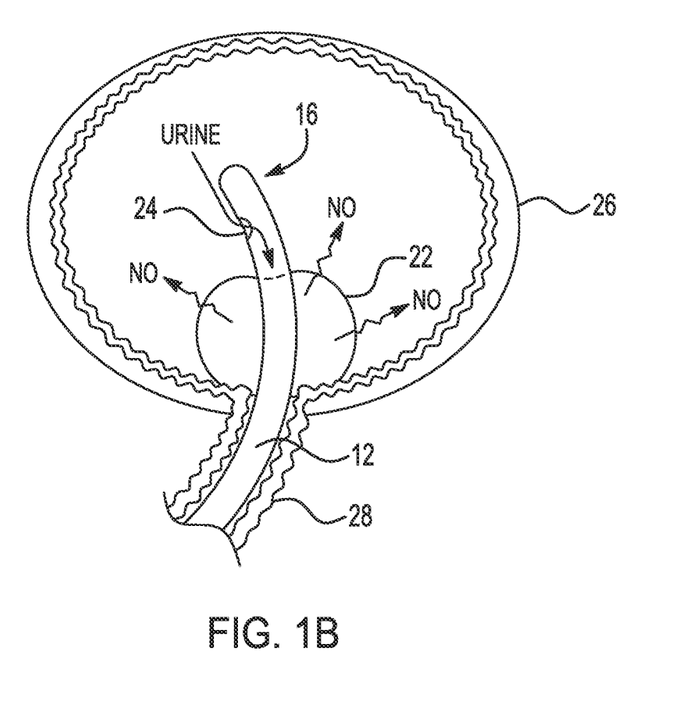
FIG. 1B is a schematic illustration of a portion of the urinary catheter of FIG. 1A inserted into a bladder and releasing nitric oxide into the bladder in accordance with an example of the method disclosed herein.

An example of the urinary catheter 10 is shown in FIG. 1A, and an example of the urinary catheter 10 inserted into the bladder 26 of a patient is shown in FIG. 1B. The urinary catheter 10 includes a dual lumen tube 12 and opposed ends 14, 16. The dual lumen tube 12 may be any suitable material, such as natural latex, coated natural latex, silicone, polyurethane, or polyvinyl chloride.

While not shown in FIG. 1A or FIG. 1B, the dual lumen tube 12 includes one lumen dedicated to urinary drainage (e.g., urinary drainage lumen) and a second lumen dedicated to balloon inflation/deflation (e.g., balloon inflation lumen). At one opposed end 14 (which is not inserted into the patient), the dual lumen tube 12 is split into two ports 18, 20 (FIG. 1A). The balloon port 18 is in fluid communication with the inflatable and nitric oxide permeable balloon 22, and is used to introduce the nitric oxide generating fluid into the balloon 22 once the dual lumen tube 12 is inserted into an appropriate position within the patient's bladder 26. The urine drainage port 20 is in fluid communication with the bladder 26, and is used to drain urine from the patient's bladder 26. At the other end 16 dual lumen tube 12, there is a bladder opening 24 in the one lumen dedicated to urinary drainage. This bladder opening 24 allows the urine to drain from the bladder 26 into a suitable drainage bag or other waste container connected to the urine drainage port 20.

The urinary catheter 10 also includes the inflatable and nitric oxide permeable balloon 22. The balloon 22 is shown deflated in FIG. 1A, and is shown inflated in FIG. 1B.

Examples of suitable nitric oxide permeable materials for the catheter balloon 22 include polymer materials, which may be selected from the group consisting of a polyurethane (PU), a silicone rubber (SR), a thermoplastic silicone-polycarbonate-urethane, a poly(vinyl chloride), a siloxane-based polyurethane elastomer, copolymers of SR and PU, copolymers of PU and polycarbonate, and combinations thereof. In one example, the inflatable and nitric oxide permeable balloon 22 is a polymer material selected from the group consisting of a polyurethane, a silicone rubber, a thermoplastic silicone-polycarbonate-urethane, a poly(vinyl chloride), and a siloxane-based polyurethane elastomer.

When the walls of the catheter balloon 22 are permeable to nitric oxide, the nitric oxide generated from the solution within the balloon 22 may be emitted over the entire outer surface of the balloon 22. The NO at least substantially prevents bacteria adhesion and biofilm formation on the outer balloon surface. For example, the increased levels of NO that are generated will be therapeutic, and will be sufficient to help kill bacteria and viruses, disrupt bacterial biofilm formation, and disperse or prevent microbial biofilm formation (e.g., disperse antibiotic resistant biofilms).

In the examples disclosed herein, the inflatable and nitric oxide permeable balloon 22 is free of a nitric oxide generating agent. In other words, a nitric oxide generating agent (e.g., an NO donor, such as RSNO) is not incorporated into the walls of the balloon 22, and/or is not integrated into a coating that is applied to the interior or exterior walls of the balloon 22. As such, the balloon 22 does not participate in nitric oxide generation (e.g., does not hold/contain a reactant), but rather, is a conduit for releasing nitric oxide, that is generated by the nitric oxide generating solution inside of the balloon 22, out into the bladder 26.

The balloon 22 is located near the end 16 of the dual lumen tube 12. As shown in FIG. 1B, the balloon 22 is near the bladder opening 24, and is inserted into the patient's bladder 26 during use. The balloon 22 is upstream of the bladder opening 24 and downstream from the drainage opening at the distal end of the catheter 10. When inflated with the nitric oxide generating solution disclosed herein, the balloon 22 can function to hold the catheter 10 in place, as illustrated in FIG. 1B.

The urinary catheter 10 shown in FIG. 1A and FIG. 1B is known as a Foley catheter. It is to be understood that other urinary catheter designs may also be used, as long as the catheter 10 includes the balloon 22 and the balloon 22 is made of a material that is permeable to nitric oxide. It is to be further understood that any commercially available urinary catheter may be used in the method disclosed herein, as long as the catheter 10 includes the balloon 22 and the balloon 22 is made of a material that is permeable to nitric oxide.

During the method disclosed herein, the urinary catheter 10 is introduced into the patient before the nitric oxide generating solution is introduced into the balloon 22. As shown in FIG. 1B, the end 16 of the dual lumen tube 12 is inserted into the bladder 26 through the urethra 28 so that both the bladder opening 24 and the inflatable and nitric oxide permeable balloon 22 are positioned in the bladder 26.

The nitric oxide generating solution is then introduced into the balloon 22 through the balloon port 18 and the lumen dedicated to balloon inflation/deflation. As one example, a syringe may be used to introduce the nitric oxide generating solution into the balloon port 18.

The amount of the nitric oxide generating solution introduced depends upon the volume of the balloon 22. The volume of nitric oxide generating solution introduced may range from about 1.5 mL to about 15 mL. The following table provides example balloon sizes (French Size) and a corresponding amount of the nitric oxide generating solution that can be introduced.

Some examples of the method may also include introducing a small volume of pure water into the dual lumen tube 12 after the balloon 22 is almost filled. The addition of pure water can rinse all potential solid materials from the dual lumen tube 12 after evaporation of the water.

TABLE 1

| French Size | Corresponding NO Generating Solution (mL) |
|---|---|
| 6 FR | 1.5 |
| 8 FR | 3-5 |
| 10 FR | 3-5 |
| 12 FR | 5-10 |

TABLE 1-continued

| French Size | Corresponding NO Generating Solution (mL) |
|---|---|
| 14 FR | 5-10 |
| 16 FR | 5-15 |
| 18 FR | 5-15 |

As depicted in FIG. 1B, the inflated balloon 22 holds the urinary catheter 10 in place and also provides a nitric oxide releasing mechanism within the bladder 26.

Because the reconstitution of the powder formulation in the liquid carrier exposes the RSNO to water, the RSNO immediately begins to slowly decompose and liberate nitric oxide. As such, the nitric oxide generating solution is introduced into the catheter balloon 22 within a predetermined time frame of its preparation to ensure that the bulk of nitric oxide is generated and released while the catheter is in vivo. In an example, the predetermined time is up to 30 minutes. In other words, the nitric oxide generating solution can be introduced into the catheter balloon 22 immediately after its preparation or at any time up to 30 minutes after its preparation.

Some examples of the method further include allowing the urinary catheter 10, with the solution in the inflatable and nitric oxide permeable balloon 22, to remain in the patient for a duration ranging from three days to up to seven days after the nitric oxide generating solution is introduced.

In some examples, the nitric oxide generating solution may then be drained from the urinary catheter 10, and the urinary catheter 10 may then be removed from the patient. If needed, a new catheter 10 may be introduced and the method repeated with a fresh reconstituted formulation.

In other examples, the method may further include draining the nitric oxide generating solution from the inflatable and nitric oxide permeable balloon 22; mixing a second liquid carrier and a second powder formulation including an S-nitrosothiol (RSNO) powder to form a second nitric oxide generating solution; and within a predetermined time of the draining and the mixing, introducing the second nitric oxide generating solution into the inflatable and nitric oxide permeable balloon 22 of the urinary catheter 10 that remains inserted in the patient.

The urinary catheter 10 and the powder formulation disclosed herein may be part of a kit. For example, the kit includes a urinary catheter 10 including an inflatable and nitric oxide permeable balloon 22; and a powder formulation including an S-nitrosothiol (RSNO) powder. Any example of the powder formulation and the urinary catheter 10 may be included in the kit. In some examples, the kit includes a container that stores the powder formulation, wherein the container shields the powder formulation from light and moisture. In some examples, the kit also includes a container for dissolving the powder formulation. In other examples, the kit also includes the liquid carrier.

To further illustrate the present disclosure, examples are given herein. It is to be understood that these examples are provided for illustrative purposes and is not to be construed as limiting the scope of the present disclosure.

EXAMPLES

Example 1

A commercially available silicone rubber Foley catheter (14 Fr, 5 cc balloon) was used in this example.

A 50 mM GSNO solution was prepared by dissolving GSNO in pure, filtered DI water. The freshly prepared solution was filled into the balloon of the catheter.

Figure 2A:
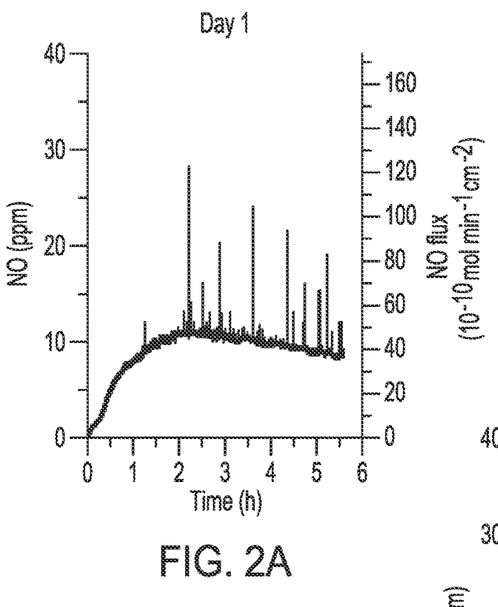
FIGS. 2A through 2C are graphs depicting the nitric oxide (NO) release profiles in terms of amount (ppm, left Y axis) and flux ($10^{-10}$ mol $\text{min}^{-1}$ $\text{cm}^{-2}$, right Y axis) versus time (hours (h), X axis) on day 1 after insertion and balloon inflation (FIG. 2A), on day 2 after insertion and balloon inflation (FIG. 2B), and on day 3 after insertion and balloon inflation (FIG. 2C)
Figure 2B:
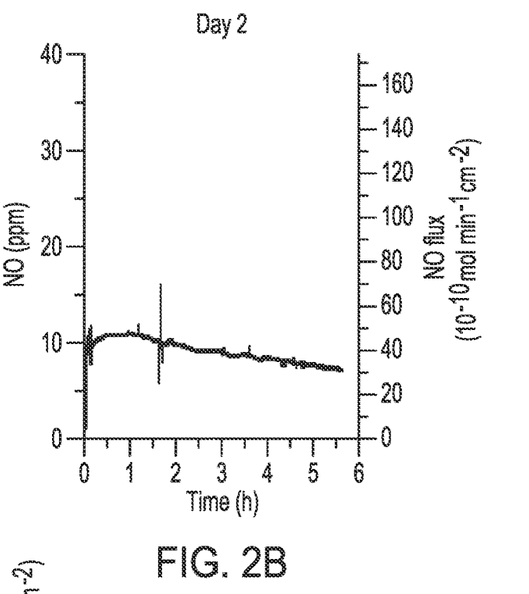
Figure 2C:
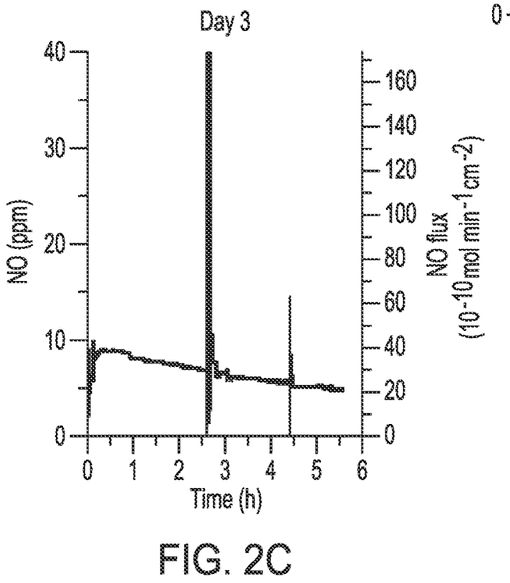

The NO released from the outer surface of the balloon was monitored via chemiluminescence. As shown in FIG. 2A, FIG. 2B, and FIG. 2C, NO release was observed for at least 6 hours per day for 3 consecutive days. The average flux observed on day 1, day 2, and day 3 was 35, 30, and 20 ($\times 10^{-10}$ mol/cm$^2$/min) respectively, each of which is higher than the normal physiological level (which ranges from about $0.5 \times 10^{-10}$ mol/cm$^2$/min to about $4.0 \times 10^{-10}$ mol/cm$^2$/min) that comes from endothelial cells that line the inner walls of blood vessels. The observed levels are capable of significant antimicrobial activity.

The results in this Example demonstrate that a solution of GSNO powder (without other additives) can generate suitable levels of nitric oxide within the catheter balloon and that the catheter balloon can release the NO into the surrounding environment. The NO levels achieved were surprising given the lack of additives. These results could be enhanced even more with the addition of one or more of the additives set forth herein.

Example 2

Two commercially available silicone rubber Foley catheters (14 Fr, 5 cc balloon) were used in this example.

For the example, a 50 mM GSNO solution was prepared by dissolving GSNO in pure, filtered DI water. The freshly prepared solution was filled into the balloon of the example catheter. For the control example, a pure, filtered DI water was filled into the balloon of the control catheter.

The inflated urinary catheter balloons were each placed into a respective glass flask, which was then filled with synthetic urine. Urinary isolate *E. coli* (ATCC 700928) was inoculated in the synthetic urine at a concentration of $1 \times 10^6$ CFU/ml. The inflated urinary catheter balloons were incubated for 7 days at 37° C. with horizontal shaking at 80 rpm.

After incubation, the inflated urinary catheter balloons were used for biofilm quantification and microscopic imaging of the bacterial load on the outer surfaces of the balloons.

Figure 3A:
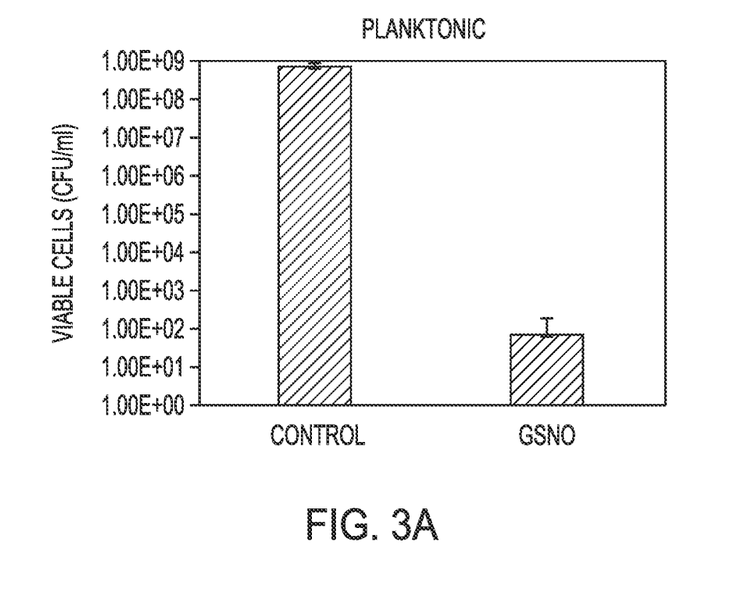
FIG. 3A is a graph depicting the viable cells (CFU/ml) of planktonic bacteria on control and example catheters after incubation in synthetic urine and Urinary isolate *E. coli;*
Figure 3B:
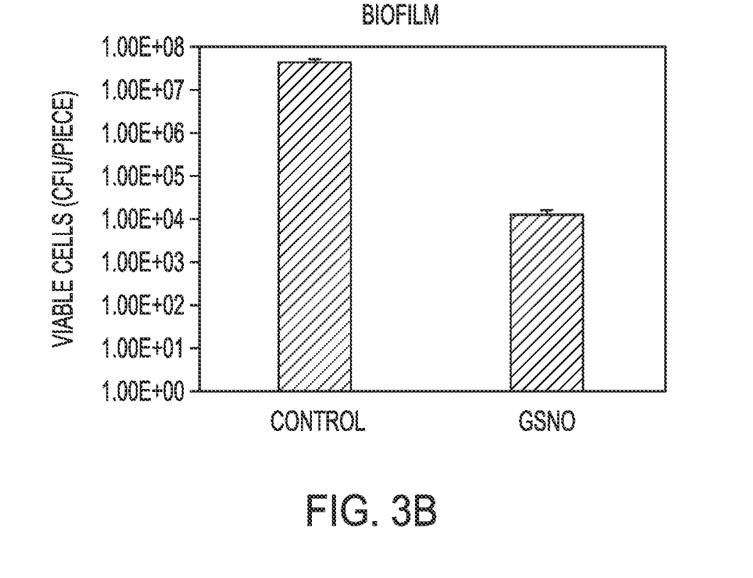
FIG. 3B is a graph depicting the viable cells (CFU/piece) of biofilm on control and example catheters after incubation in synthetic urine and Urinary isolate *E. coli;*

FIGS. 3A and 3B depict the quantification results for planktonic bacteria and biofilm. As illustrate, the control catheter had much more planktonic bacteria and biofilm formation than the example catheter.

Figure 4A:
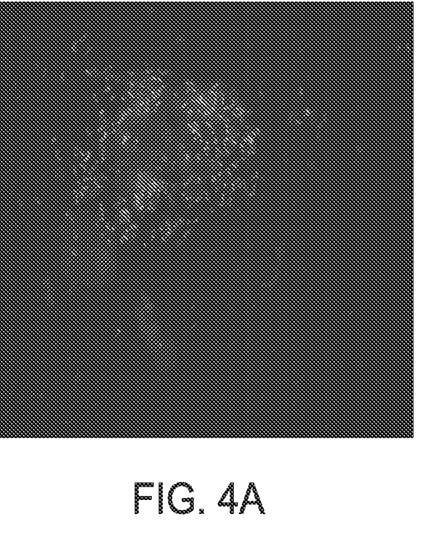
FIGS. 4A and 5A are confocal images (reproduced in black and white) of the control catheter after incubation in synthetic urine and Urinary isolate *E. coli*.
Figure 4B:
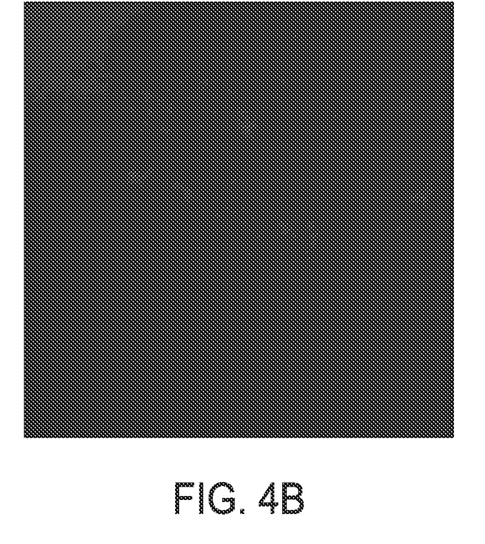
FIGS. 4B and 5B are confocal images (reproduced in black and white) of the example catheter after incubation in synthetic urine and Urinary isolate *E. coli.*
Figure 5A:
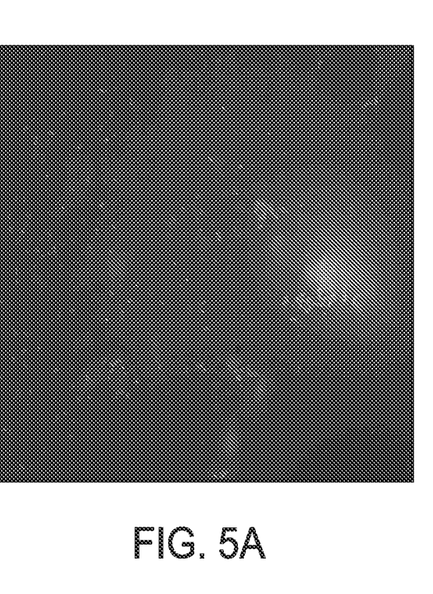
Figure 5B:
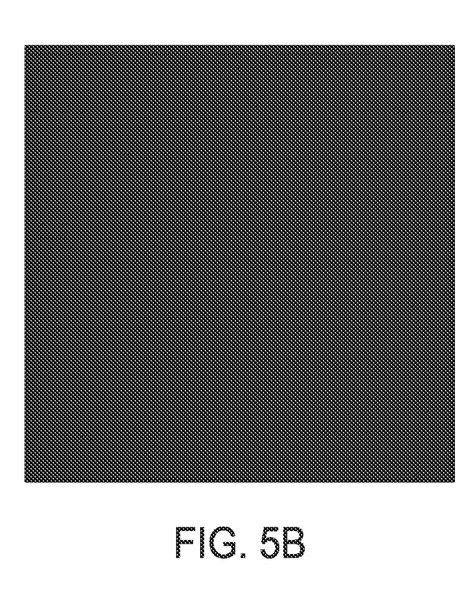

FIGS. 4A and 5A depict black and white reproductions of originally colored microscopic images of the control catheter. FIGS. 4B and 5B depict black and white reproductions of originally colored microscopic images of the example catheter. Clearly, the control catheter has much more biofilm formation, whereas the example catheter had almost none.

The results in this Example demonstrate that a solution of GSNO powder (without other additives) can generate suitable levels of nitric oxide within the catheter balloon and that the catheter balloon can release the NO into the surrounding environment. The NO levels achieved were surprising given the lack of additives. These results could be enhanced even more with the addition of one or more of the additives set forth herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 0.005 M to about 0.2 M should be interpreted to include not only the explicitly recited limits of about 0.005 M to about 0.2M, but also to include individual values, such as 0.05 M, 0.1 M, 0.17 M, 0.025 M, etc., and sub-ranges, such as from about 0.007 M to about 0.17 M, from about 0.015 M to about 0.125 M, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method, comprising:
    mixing a liquid carrier and a powder formulation including an S-nitrosothiol (RSNO) powder to form a nitric oxide generating solution;
    within a predetermined time of mixing, introducing the nitric oxide generating solution into an inflatable and nitric oxide permeable balloon of a urinary catheter that is inserted in a patient;
    draining the nitric oxide generating solution from the inflatable and nitric oxide permeable balloon;
    mixing a second liquid carrier and a second powder formulation including an S-nitrosothiol (RSNO) powder to form a second nitric oxide generating solution; and
    within a predetermined time of the draining and the mixing, introducing the second nitric oxide generating solution into the inflatable and nitric oxide permeable balloon of the urinary catheter that remains inserted in the patient.

2. The method as defined in claim 1, further comprising adjusting a pH of the nitric oxide generating solution to a value ranging from 5 to 8 prior to introducing the nitric oxide generating solution into the inflatable and nitric oxide permeable balloon.

3. The method as defined in claim 1, further comprising allowing the urinary catheter, with the solution in the inflatable and nitric oxide permeable balloon, to remain in the patient for a duration ranging from 1 day to up to seven days after the nitric oxide generating solution is introduced.

4. The method as defined in claim 1 wherein the mixing involves adding the liquid carrier to the powder formulation to form the solution having a molar concentration of dissolved RSNO ranging from about 500 µM to about 50 mM.

5. The method as defined in claim 1 wherein the liquid carrier is deionized water.

6. The method as defined in claim 1 wherein the powder formulation consists of the RSNO powder, an optional additive to control or accelerate a rate of release of NO from the RSNO powder after the powder formulation is dissolved in the liquid carrier, and an optional buffer salt.

7. The method as defined in claim 1, further comprising storing the powder formulation in conditions that shield the powder formulation from light and moisture.

8. The method as defined in claim 1, wherein the inflatable and nitric oxide permeable balloon is free of a nitric oxide generating agent.

9. The method as defined in claim 1, wherein the predetermined time is up to 30 minutes.

* * * * *